(12) United States Patent
Pettinati et al.

(10) Patent No.: US 7,430,719 B2
(45) Date of Patent: Sep. 30, 2008

(54) CONTACT TEXT BOX

(75) Inventors: Fabio Pettinati, San Jose, CA (US);
John-Anthony Owens, Seattle, WA (US); Jonathan D. Perlow, Seattle, WA (US); Melissa W. Dunn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 619 days.

(21) Appl. No.: 10/885,974

(22) Filed: Jul. 7, 2004

(65) Prior Publication Data

US 2006/0010104 A1  Jan. 12, 2006

(51) Int. Cl.
*G06F 3/00* (2006.01)
(52) U.S. Cl. ..................... 715/739
(58) Field of Classification Search ............. 715/739
See application file for complete search history.

(56) References Cited

U.S. PATENT DOCUMENTS

| | | | |
|---|---|---|---|
| 5,214,756 A | 5/1993 | Franklin | |
| 5,640,565 A | 6/1997 | Dickinson | |
| 5,737,726 A | 4/1998 | Cameron | |
| 5,767,897 A | 6/1998 | Howell | |
| 5,870,744 A * | 2/1999 | Sprague | 707/9 |
| 5,873,108 A | 2/1999 | Goyal et al. | |
| 5,913,032 A * | 6/1999 | Schwartz et al. | 709/213 |
| 5,923,848 A * | 7/1999 | Goodhand et al. | 709/219 |
| 5,950,193 A | 9/1999 | Kulkarnia | |
| 5,999,208 A | 12/1999 | McNerney | |
| 6,014,135 A | 1/2000 | Fernandes | |
| 6,065,012 A | 5/2000 | Balsara | |
| 6,208,339 B1 | 3/2001 | Atlas | |
| 6,209,005 B1 | 3/2001 | Harker | |
| 6,216,122 B1 | 4/2001 | Elson | |
| 6,247,043 B1 * | 6/2001 | Bates et al. | 709/200 |
| 6,269,369 B1 | 7/2001 | Robertson | |
| 6,339,826 B2 | 1/2002 | Hayes, Jr. | |
| 6,434,564 B2 | 8/2002 | Ebert | |
| 6,460,074 B1 | 10/2002 | Fishkin | |
| 6,539,379 B1 | 3/2003 | Vora | |
| 6,557,004 B1 | 4/2003 | Ben-Schachar et al. | |
| 6,564,327 B1 | 5/2003 | Klensin | |
| 6,571,235 B1 * | 5/2003 | Marpe et al. | 707/3 |
| 6,581,062 B1 | 6/2003 | Draper | |

(Continued)

FOREIGN PATENT DOCUMENTS

WO  WO02/073454 A2  9/2002

OTHER PUBLICATIONS

Anderson, T., *Change Your Outlook*, Developer Network Journal, No. 25, p. 50-1, Jul.-Aug. 2001.

(Continued)

*Primary Examiner*—Stephen Hong
*Assistant Examiner*—Samir Termanini
(74) *Attorney, Agent, or Firm*—Workman Nydegger

(57) ABSTRACT

A contact text box interface for resolving user input with contact information selected from contact directories and compared against usage patterns. Users are provided with a list of potentially relevant contacts from which a selection can be made. When a contact is selected, the corresponding and appropriate contact information is automatically provided to the application. Various criteria can be used to identify which contacts will be presented to the user and how they will be presented.

40 Claims, 5 Drawing Sheets

U.S. PATENT DOCUMENTS

| | | |
|---|---|---|
| 6,661,434 B1 | 12/2003 | MacPhail |
| 6,668,281 B1 | 12/2003 | Ayyadurai |
| 6,678,685 B2 | 1/2004 | McGill |
| 6,699,125 B2 | 3/2004 | Kirmse |
| 6,701,348 B2 * | 3/2004 | Sommerer ............... 709/206 |
| 6,718,366 B2 | 4/2004 | Beck |
| 6,753,889 B1 | 6/2004 | Najmi |
| 6,781,608 B1 | 8/2004 | Crawford |
| 6,791,583 B2 | 9/2004 | Tang |
| 6,883,000 B1 | 4/2005 | Gropper |
| 6,959,340 B1 | 10/2005 | Najmi |
| 6,983,310 B2 | 1/2006 | Rouse |
| 6,985,924 B2 | 1/2006 | Schwartz |
| 6,988,128 B1 | 1/2006 | Alexander |
| 6,990,495 B1 | 1/2006 | Grason |
| 6,993,712 B2 | 1/2006 | Ramachandran |
| 7,007,149 B2 * | 2/2006 | Chung ................... 711/170 |
| 7,010,572 B1 | 3/2006 | Benjamin |
| 7,010,599 B2 | 3/2006 | Shrinivasan |
| 7,043,471 B2 * | 5/2006 | Cheung et al. .............. 707/3 |
| 7,068,768 B2 * | 6/2006 | Barnes ............... 379/142.15 |
| 7,076,498 B2 | 7/2006 | Banerjee |
| 7,096,232 B2 | 8/2006 | Doss |
| 7,130,853 B2 | 10/2006 | Roller |
| 7,139,774 B2 | 11/2006 | Dettinger |
| 7,143,190 B2 | 11/2006 | Christensen |
| 7,146,570 B2 | 12/2006 | Yeh |
| 7,149,731 B2 | 12/2006 | Dettinger |
| 7,159,207 B2 * | 1/2007 | Tang et al. ............... 717/109 |
| 7,162,474 B1 * | 1/2007 | Harker et al. ............... 707/9 |
| 7,185,290 B2 | 2/2007 | Cadiz |
| 7,191,210 B2 | 3/2007 | Grossman |
| 7,209,951 B2 | 4/2007 | Goldberg |
| 7,240,298 B2 | 7/2007 | Grossman |
| 2002/0029254 A1 | 3/2002 | Davis |
| 2002/0073207 A1 | 6/2002 | Widger |
| 2002/0107914 A1 | 8/2002 | Charisius |
| 2002/0156895 A1 | 10/2002 | Brown |
| 2002/0169841 A1 * | 11/2002 | Carlson et al. ............ 709/206 |
| 2002/0186257 A1 | 12/2002 | Cadiz et al. |
| 2003/0041065 A1 | 2/2003 | Lucovsky |
| 2003/0069874 A1 | 4/2003 | Hertzog |
| 2003/0158855 A1 * | 8/2003 | Farnham et al. ........... 707/102 |
| 2003/0210265 A1 | 11/2003 | Haimberg |
| 2004/0083453 A1 | 4/2004 | Knight |
| 2004/0103364 A1 | 5/2004 | Dornback |
| 2004/0107283 A1 | 6/2004 | Paddon |
| 2004/0119732 A1 | 6/2004 | Grossman |
| 2004/0119758 A1 | 6/2004 | Grossman |
| 2004/0119760 A1 | 6/2004 | Grossman |
| 2004/0122683 A1 | 6/2004 | Grossman |
| 2004/0122822 A1 | 6/2004 | Thompson |
| 2004/0177082 A1 | 9/2004 | Nitta |
| 2004/0199581 A1 | 10/2004 | Kucharewski |
| 2004/0210844 A1 | 10/2004 | Pettinati |
| 2004/0235520 A1 | 11/2004 | Cadiz |
| 2004/0243935 A1 | 12/2004 | Abramovitch |
| 2005/0015439 A1 | 1/2005 | Balaji |
| 2005/0080805 A1 | 4/2005 | Haeberle |
| 2005/0091072 A1 | 4/2005 | Dunn |
| 2005/0131888 A1 | 6/2005 | Tafoya |
| 2005/0182741 A1 | 8/2005 | Grossman |
| 2005/0262208 A1 | 11/2005 | Haviv |
| 2006/0041545 A1 | 2/2006 | Heidloff |
| 2006/0053384 A1 | 3/2006 | Le Fetra |
| 2006/0064645 A1 | 3/2006 | Neven |
| 2006/0253787 A1 | 11/2006 | Fogg |
| 2006/0277213 A1 | 12/2006 | Robertson |

OTHER PUBLICATIONS

Taylor, T.C., *Databases Save Time And Customers*, Sales & Marketing Management, vol. 142, No. 4, p. 105-7, Mar. 1990.

Kubota, K.; Masuno, H., Multi-Media Software PI, NEC Technical Journal, vol. 41, No. 13, p. 72-6, Nov. 1988.

Pettigrew, T., ACT!- Automated Contact Tracking, CA Magazine, vol. 95, No. 1022, p. 48-9, Sep. 1991.

Simaioforidis, A.; Karlgren, J.; Ereback, A., Research and Advanced Technology for Digital Libraries, Second European Conference, ECDL '98. Proceedings, p. 673-4, Sep. 21-23, 1998.

Heller, S.R., Symantec ACT! 4.0 for Windows, Journal of Chemical Information and Computer Sciences, vol. 38, No. 4, p. 772, Jul.-Aug. 1998.

Notice of Allowance mailed Jul. 3, 2007 cited in related U.S. Appl. No. 10/324,746.

U.S. Appl. No. 11/760,392, filed Jun. 8, 2007, Grossman.

Microsoft Computer Dictionary, 2002, Microsoft Press, 5th edition, p. 162.

Padwick, Feddema, Special Edition Using Microsoft Outlook 2000, Que, Ch. 9 'Managing Contacts', p. 1-17.

Padwick, Feddema, Special Edition Using Microsoft Outlook 2000, Que, Ch. 16 'Managing Your Computer Environment': Using Other Shortcuts in the Outlook Bar, p. 1-4.

Padwick, Feddema, Special Edition Using Microsoft Outlook 2000, Que, Ch. 18 'Finding and Organizing Outlook Items': Using the QuickFind Contact Tool, p. 1-4.

Padwick, Feddema, Special Edition Using Microsoft Outlook 2000, Que, Ch. 18 'Finding and Organizing Outlook Items': Organizing Outlook Items, p. 1-7.

Padwick, Feddema, Special Edition Using Microsoft Outlook 2000, Que, Ch. 22 'Creating and Using Rules', p. 1-5.

Padwick, Feddema, Special Edition Using Microsoft Outlook 2000, Que, Ch. 38 'Creating Views and Print Styles', p. 1-25.

Padwick, Feddema, Special Edition Using Microsoft Outlook 2000, Que, Ch. 41 'Creating and Using Custom Fields': Why Do You Need Custom Fields?, p. 1-14.

Padwick, Feddema, Special Edition Using Microsoft Outlook 2000, Que, Ch. 41 'Creating and Using Custom Fields': Creating a Simple Custom Field, p. 1-3.

Padwick, Feddema, Special Edition Using Microsoft Outlook 2000, Que, Appendix C 'Outlook's Files, Folders, Fields, and Registry Keys', p. 1.

Mohamed; "Marketcircle a recipient of the 2002 Apple Design Awards"; May 15, 2002; Marketcircle.

Hibbert, Chris, "Visual Flex and XML", downloaded from www.dataaccess.com/whitepapers/xml/XMLWP.htm, dated by Wayback Machine as: May 2, 2001, pp. 1-25.

Dogac, Asuman, et al., "An ebXML Infrastructure Implementation through UDDI Registries and RosettaNet PIPs", ACMSIGMOD 2002, Madison, WI, Jun. 4-6, 2002, pp. 512-523.

Ren, Ligang, et al., "Data Synchronization in the Mobile Internet", The 7th Intl Conf on CSCW in Design, Sep. 25-27, 2002, pp. 95-98.

Lee, Jinho, et al., "An Evaluation of the Incorporation of a Semantic Network Into a Multidimensional Retrieval Engine", CIKM '03 New Orleans, LA, Nov. 3-8, 2003, pp. 572-575.

Su, Hong, et al., "Automating the Transformation of XML Documents", WIDM 2001, Atlanta, GA, Nov. 2001, pp. 68-75.

McCabe, M. Catherine, et al., "On the Design and Evaluation of a Multi-Dimensional Approach to Information Retrieval", SIGIR 2000, Athens, Greece, Jul. 2000, pp. 363-365.

Bussler, Chrisoph, et al., "A Conceptual Architecture for Semantic Web Enabled Services", SIGMOD Record, vol. 31, No. 4, Dec. 2002, pp. 24-29.

Nejdl, Wolfgang, et al., "EDUTELLA: A P2P Networking Infrastructure Based on RDF", WWW 2002, Honolulu, HI, May 7-11, 2002, pp. 604-615.

Bychkov, Yury, et al., "Interactive Migration of Legacy Databases to Net-Centric Technologies", Proceedings of the 8th Working Conference on Reverse Engineering, Oct. 2-5, 2001, pp. 328-334.

Bakker, John-Luc, et al., "Next Generation Service Creation Using XML Scripting Languages", IEEE International Conference on Communications, vol. 4, Apr. 22 May 2, 2001, pp. 2001-2007.

Office Action mailed Jun. 22, 2007 cited in related U.S. Appl. No. 10/692,257.

Notice of Allowance mailed Mar. 27, 2007 cited in related U.S. Appl. No. 10/324,251.

Office Action mailed Aug. 3, 2007, cited in related U.S. Appl. No. 10/324,243.

Notice of Allowance mailed Aug. 8, 2007, cited in related U.S. Appl. No. 10/326,660.

Notice of Allowance mailed Aug. 9, 2007, cited in related U.S. Appl. No. 10/324,250.

Kim, Sung Wan, et al., "Developing a Native Storage Structure for XML Repository System in Main Memory", 5th International Conference on High Speed Networks and Multimedia Communications, © 2002, pp. 96-100.

Shui, William M., et al., "Application of XML Schema and Active Rules System in Management and Integration of Heterogeneous Biological Data", BIBE '03, Mar. 10-12, 2003, pp. 367-374.

Banerjee, Sandeepan, et al., "Oracle8i—The XML Enabled Data Management System", 16th International Conference on Data Engineering, San Diego, CA Feb. 29-Mar. 3, 2000, pp. 561-568.

Haas, L.M., et al. "Transforming Heterogeneous Data with Database Middleware: Beyond Integration", Bulletin of the IEEE Computer Society Technical Committee on Data Engineering, © 1997, pp. 1-6.

Nambiar, Uilas, et al., "Current Approaches to XML Management", IEEE Internet Computing, vol. 6, Issue4, Jul./Aug. 2002, pp. 43-51.

Lear, Ann C., et al, "XML Seen as Integral to Application Integration", IT Professional, vol. 1, Issue 5, Sep./Oct. 1999, pp. 12-16.

Paul McFedries, Complete Idiot's Guide to Windows XP, Pub Date: Oct. 3, 2001. pp. 1-3.

Paul Thurrott's SuperSite for Windows: Internet Explorer 5.0 Reviewed. Duke Communications International, Inc. 2000. pp. 1-8.

Office Action dated Aug. 17, 2007 cited in related U.S. Appl. No. 10/780,496.

Office Action dated Aug. 23, 2007 cited in related U.S. Appl. No. 10/845,464.

Notice of Allowance dated Oct. 5, 2007 cited in related U.S. Appl. No. 10/326,660.

Notice of Allowance dated Oct. 2, 2007 cited in related U.S. Appl. No. 10/324,250.

* cited by examiner

CONTACT TEXT BOX

BACKGROUND OF THE INVENTION

1. The Field of the Invention

The present invention relates to user interface menus in computers and electronic devices and, more particularly, to methods, systems, and computer program products for identifying, resolving and displaying desired contact information in computer applications.

2. Background and Relevant Art

The term "contact," as described herein, generally refers to any person, group, organization, business, household, or other type of identifiable entity. The term "contact information," as defined herein, generally refers to any information that corresponds to a contact and that may be considered relevant for identifying, contacting, accessing, corresponding or communicating with the contact. In the context of the present application, contact information is used by an application to perform a desired function, such as, for example, sending an email, initiating a telephone call, accessing a website, initiating a gaming session, performing a financial transaction, and so forth. Non-limiting examples of contact information include names, aliases, telephone numbers, email addresses, home addresses, instant messaging (IM) addresses, and web addresses. In some instances, as described herein, contact information can also refer to physical characteristics of a contact. For example, facial mapping characteristics, fingerprints and other characteristics that can be used to identify a contact can also be broadly considered as contact information.

Many applications require contact information. Examples of some applications that require contact information include email applications, network gaming applications, instant messaging applications, telephone and telephony applications, Internet applications, financial applications, word processing applications, and business management applications.

Applications that require contact information typically provide interfaces and menus for entering the desired contact information within one or more "type-in" lines. "Type-in" lines generally comprise an input field configured to receive user input comprising typed text or other characters that can be used to generate desired contact information. For example, an email interface will typically include type-in lines for receiving text comprising the email addresses of the intended email recipients. Contact information is typically typed directly into the appropriate type-in lines, hence the name.

Some interfaces are also configured to automatically populate a type-in line with desired contact information, which is obtained from a directory corresponding to the particular application. For example, email applications typically include interface menus for looking up the email addresses of the contacts that are stored within the email contact directory. Likewise, a telephony application typically includes interface menus for looking up and accessing the telephone numbers of the contacts stored in the telephony contact directory. This search functionality provided by some interfaces is useful for helping to identify and select contact information that has either been forgotten or that is undesirably too long for manual entry.

Although existing interfaces for obtaining contact information are useful for their intended purposes, their utility is somewhat limited because they are specifically catered for a particular application. (e.g., Email search interfaces are configured to obtain email addresses, telephony search interfaces are configured to obtain telephone numbers, etc.) Furthermore, the vast array of different interfaces, each having its own unique characteristics, has complicated the task of learning how to utilize the interfaces to search for and obtain the desired contact information.

Despite the advances that have been achieved in this technology, there are still on ongoing needs to improve the methods and systems for identifying and displaying contact information.

BRIEF SUMMARY OF THE INVENTION

The present invention is directed to improved methods, systems, and corresponding computer program products and interfaces for identifying and displaying contact information.

According to one aspect of the invention, a contact text box provides a user interface for displaying contact information. The contact text box can be customized for use with virtually any application that receives user input and requires the use of contact information.

The contact text box receives a request from an application to resolve user input that is received by an application, presumably, but not necessarily, within a type-in line provided by the application. The contact text box then utilizes any number of resolvers to query and compare the user input against usage pattern data comprising contact information.

Matches between the user input and the usage pattern data are displayed by the contact text box for selection by the user. In some instances, the displayed matches are also organized in accordance with the usage pattern data. For example, the matches that have the most frequent use can be displayed first, inasmuch as it is more likely that such matches will be selected by the user than matches that are not as frequently used.

In other instances, the contact text box also segments the displayed matches into groupings based on the resolvers or databases that are used to identify the matches. For example, matches identified by a first resolver searching for contacts stored in a work directory can be visually segmented from matches identified by a second resolver searching for contacts stored in a personal contacts directory.

When a displayed match is selected through appropriate user input, the user input is resolved, such that said match is used to provide the desired contact information to the calling application. In some instances, the resolved user input is replaced with a corresponding user interface (UI) object that is visually distinct from other user input entered in the type-in line. The UI object can also be configured in such a way that it cannot be modified, but only deleted.

Once the application uses the contact information to perform a desired function, the usage pattern data corresponding to that contact information is updated so that a subsequent query against that usage pattern data will be accurate and current.

At any point before a contact match is selected, additional user input comprising additional text can also be received. This new textual user input causes the resolvers to dynamically update their queries against the usage pattern data with the new text, and such that the list of matches will be dynamically updated as well. If only a single unambiguous match or possible resolution exists, that match is used to supply corresponding contact information to the calling application.

If a selected match corresponds to a plurality of possible contact information options, e.g., multiple different email addresses, for example, the plurality of different options are displayed for selection. In some instances, however, the various options corresponding to a match are not displayed unless the match is selected first.

Any number of matches and contact information can be identified and displayed in the foregoing manner. Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention is directed to improved methods, systems, and corresponding computer program products and interfaces for identifying and displaying desired contact information. Upon receiving user input corresponding to contact information, an application calls a contact text box to resolve the user input and to identify and display matches corresponding to the user input. The contact text box utilizes one or more resolvers to compare the user input against usage pattern data in one or more contact information directories. Matches that are identified by the resolvers are displayed by the contact text box.

When a match is selected, or it becomes clear which match should be selected, that match is used to resolve the user input. Resolved user input is then replaced with a new UI object corresponding to the matching contact information, visually indicating to the user that their input has been resolved. The contact information corresponding to the UI object is then provided to the application for use.

As described above, the embodiments of the invention can include the use of resolvers, which comprise computer modules, and user interfaces, all of which can be created and utilized with special purpose and general-purpose computing systems including various computer hardware and software, as discussed in greater detail below in reference to FIG. 5.

In some embodiments the computer modules, interfaces and other computing software are stored on one or more computer-readable media having computer-executable instructions for implementing the methods described herein. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media. Computer-executable instructions comprise, for example, instructions and data which cause a general purpose computer, special purpose computer, or special purpose processing device to perform a certain function or group of functions.

General Computing Modules and Components

Figure 1:
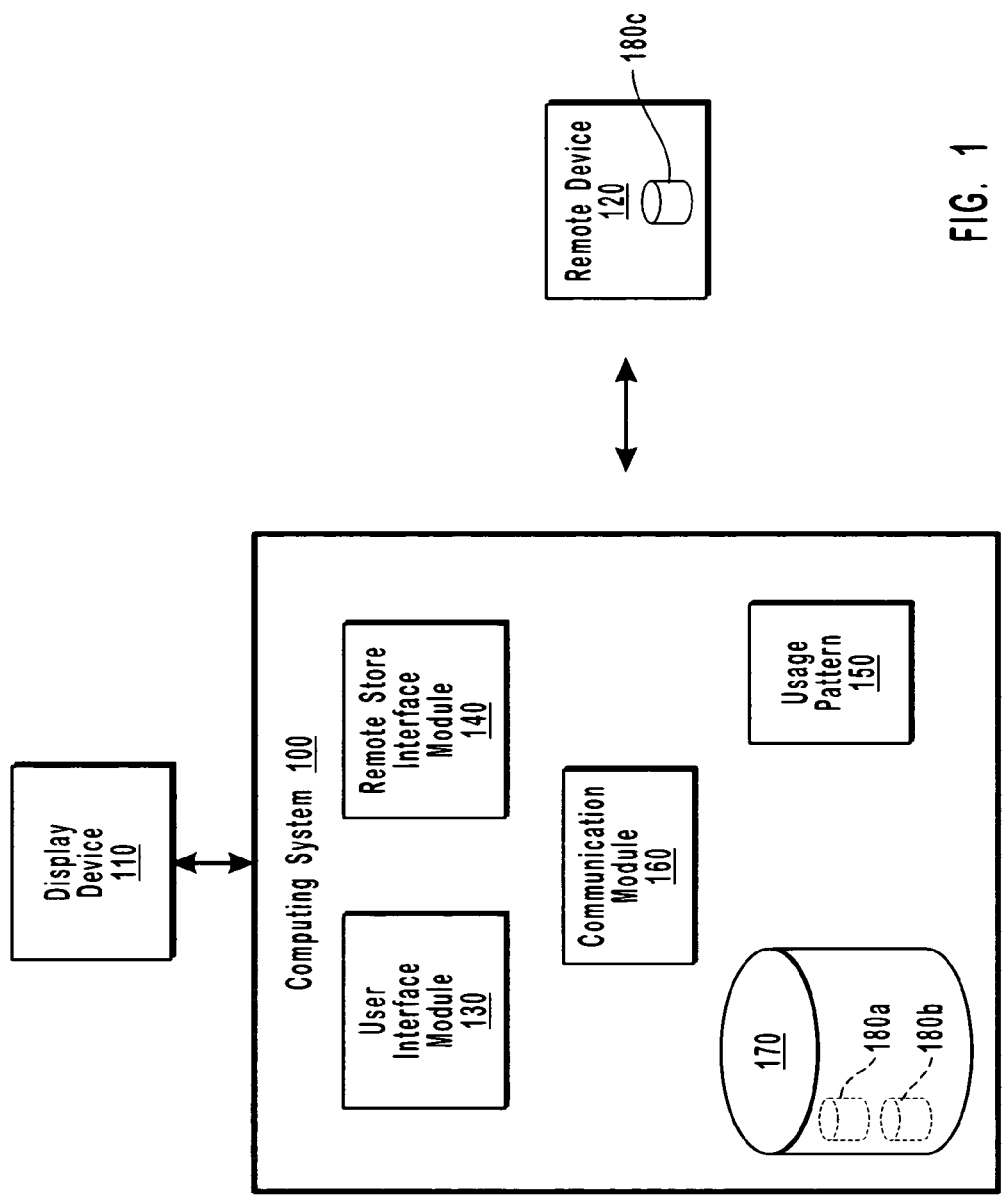
FIG. 1 illustrates one embodiment of a functional block diagram of various components of the invention.

FIG. 1 illustrates a functional block diagram of several components of the invention. As shown, a computing system 100 is connected with a display device 110 and a remote device 120. The connection link between each of these components may be a physical connection or a wireless connection. It will be appreciated that the display device 110 may be located remotely from the computing system 100 or, alternatively, integrated with the computing system 200. The display device 110 can include any screen, monitor, or other device that is configured to render images.

During use the computing system utilizes a contact text box user interface to display desired contact information at the display device. The functionality of the user interface to display desired contact information is enabled by various computer modules, such as user interface module 130, remote store interface module 140, schema module 150, conflict resolver module 155, and communication module 160, each of which will now be described.

The user interface module 130 includes sufficient computer-executable instructions for operably displaying the contact text box at the display device and for responding to user input entered at the user interface. The communication between the contact text box and the user may occur through a separate application hosting the contact text box.

The remote store interface module 140 includes sufficient computer-executable instructions for searching through and comparing user input against contact information stored at remote devices, such as remote device 120. Remote device 120 may be a remote computer, or server containing contact information. Remote store interface module 140 can also leverage usage pattern module 150 to specifically compare user input against contact information stored at remote devices and to send requests to the remote devices to update their contact information to reflect the most recent use of the contact information.

The usage pattern module 150 contains sufficient computer-executable instructions for querying contact information that is stored in local stores, such as storage media 170. The usage pattern module 150 queries the local stores to look for matches between user input and contact information stored in the local stores. According to some embodiments, the usage pattern module 150 queries the usage pattern data in the local stores to identify how and when matching contact information has been used.

The usage pattern module 150 and remote store interface module 140 utilize one or more dedicated resolvers that are configured to perform the queries and comparisons between the user input and usage pattern data that have been described above. The contact text box of the invention can utilize any number of resolvers. The resolvers can be dedicated, for example, to search different contact information directories within the local or remote computing systems. The resolvers can also be configured to search within the same or different contact information directories according to different search criteria (e.g., most recent use, most frequent use, most commonly grouped with, etc).

The communication module 160 includes sufficient computer-executable instructions for enabling communication between the various modules, as well as the display device 110, the remote device 120, and the storage media of the remote device 120 and the computing system 200. In particular, the communication module enables the modules to access and process contact information that is stored in one or more contact information directories that may be stored locally and remotely.

The present embodiment illustrates three contact information directories, 180a, 180b, and 180c. In some embodiments, these contact information directories can correspond to different applications. For example, directory 180a can correspond to an email application and directory 180b can correspond to a telephony application. In such embodiments, each directory 180a, 180b, and 180c will include information that is application specific (e.g., the email application directory 180a will have email addresses). When the directories are separated in this manner, the resolvers are specifically configured to interface with and search through the directories for contact information and usage pattern data.

In other embodiments, the resolvers are configured to search through a consolidated directory or cache that comprises a compilation of two or more different directories. Although this embodiment may require an increase in storage capacity, it can be useful to expedite the searching processes described above.

Despite the foregoing examples, it will be appreciated that the invention extends to various embodiments utilizing and accessing any combination of local, remote, independent and consolidated contact information directories.

Contact Text Box and Methods of Use

Figure 2:
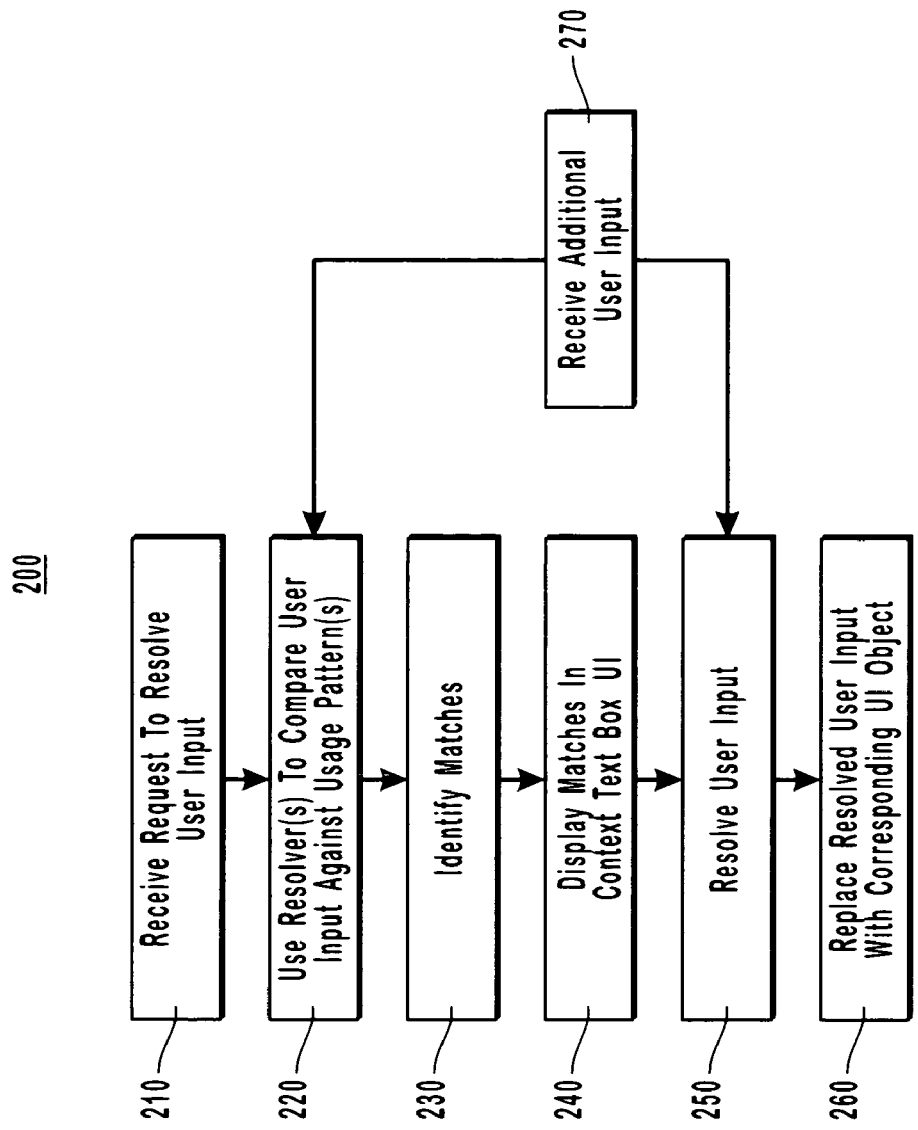
FIG. 2 is a flowchart illustrating certain acts of a method for identifying and displaying contact information according to the invention.

FIG. 2 illustrates a flowchart 200 of one method for intuitively displaying contact information with a contact text box that has been obtained from any number of contact information directories. As shown, the present embodiment includes various acts (acts 210, 220, 230, 240, 250, 260 and 270) for performing the method illustrated in FIG. 2. The acts of FIG. 2 will now be described with specific reference to FIGS. 3-4, which illustrate certain embodiments of the contact text box of the invention.

The first act of the illustrated method includes receiving a request to resolve user input. This request can be generated by an application in response to any instructions or user input. In one example, an application generates a request to resolve user input in response to a user typing input into an input object, such as a type-in line. Other types of user input can also include tabbing a prompt into a type-in line or hovering a pointer (e.g., a mouse pointer) over a type-in line. U.S. patent application Ser. No. 10/324,746, filed Dec. 19, 2002, entitled CONTACT PICKER, which is incorporated herein by reference, provides additional details regarding the types of user input that can be used to initiate a search for matching contact information and corresponding methods for searching for that contact information.

Inasmuch as different applications have different requirements and interfaces, the contact text box can be configured in different ways to accommodate different needs and preferences. Accordingly, upon receiving a request to resolve user input from an application, and as specified, an instance of the contact text box is opened at an appropriate predefined location. As further specified, one or more resolvers of the contact text box are used to query one or more appropriate contact information directories for potentially matching contact information ("matches").

As the resolvers query the contact information directories, they compare the user input against usage pattern data that is stored in the contact information directories. The usage pattern data can include any data identifying a manner and/or time in which the stored contact information has been used. Preferably, the usage pattern data is updated on a regular basis, if not on the fly, so that it is current and accurate. U.S. patent application Ser. No. 10/836,776, filed Apr. 30, 2004, entitled "Method and System for Recording and Accessing Usage of an Item in a Computer System", which is incorporated herein by reference, provides additional details regarding usage pattern data.

One purpose of querying the contact information directories is to obtain a filtered list of contacts that are most likely to be selected by a user. The determination as to what contacts are most likely to be selected by a user can be based on various criteria, however, including, but not limited to the frequency of selecting particular contacts, the last selected contacts, network or geographic proximity of the contact, compatibility of the contact's communication devices, and so forth. Accordingly, the resolvers can be customized to search according to any predefined criteria as they compare the user input against the usage patterns corresponding to the stored contact information, as mentioned above (act 220).

Preferably, although not necessarily, the contact information that is searched by the resolvers is contextually relevant to the type of application that is hosting the contact text box. For example, if the application hosting the contact text box comprises an email application, the resolvers will be configured to search for contact information comprising email addresses.

According to another embodiment, the resolvers are also configured to identify contact information matches that are most likely to be selected by the user. In particular, the usage patterns can include implicit aging properties that are based on temporal information such as, but not limited to, the frequency of selection, the time of last selection, and so forth. In other words, a contact can become 'less likely to be selected by a user' the longer the associated contact has not been selected. In this regard, the matches of contact information identified by the resolvers will not only be application relevant, they can also be filtered according to a most likely to be selected criteria.

The resolvers can compare user input against usage patterns (act 220) at the same time the contact text box identifies matches. Identifying a match typically includes the process of finding a match between the textual input entered by a user and the characters of an application relevant contact information entry (e.g., email address, it, telephone number, etc.). Although the match may be exact, it is not necessary. In fact, in some instances, the resolvers can perform 'fuzzy' matching to identify similar but different strings. U.S. patent application Ser. No. 10/324,746, entitled CONTACT PICKER, which is more fully identified above, provides additional details regarding fuzzy matching.

Although the foregoing examples relate to matching textual characters, it will be appreciated that matching can also be performed using other criteria, such as physical characteristics of a contact. For example, in a photo viewer application, one might be interested in associating a contact with the image of a person in a photo. Accordingly, for such an application, matching can be performed on non-textual characteristics or attributes, such as the facial characteristics identified by an image mapping program, for example, In such an embodiment, a resolver can match or otherwise correlate a contact with a particular set of facial characteristics.

To support embodiments in which matching is performed on criteria other than textual criteria, it will be appreciated that the contact information directories described above can include repositories of image maps and other non-textual characteristics and attributes that can be accessed by the modules described above.

As mentioned above, the criteria used to find matches and that are used to compare user input against usage patterns can also be used to filter or organize the list of contacts that are displayed to the user in a particular order. For example, a list of contacts displayed by the contact text box can be organized by placing the contacts that have the highest likelihood of selection at the top of the list. Other structured orders and sequences for listing the matching contacts or contact information can also be used.

Although the contact text box largely determines which contacts will be displayed, it will be appreciated that the displayed lists of contacts can also be controlled by the application hosting the contact text box. In particular, the applications hosting the contact text box can specify any number or combination of required characteristics a contact must possess in order to be listed by the contact picker. For example, the hosting application can also specify via a corresponding API or contact picker interface to only show contacts who are online, to only show contacts who reside in a particular region, and so forth. This is further described in the aforementioned U.S. patent application Ser. No. 10/324,746, entitled CONTACT PICKER.

Figure 3:
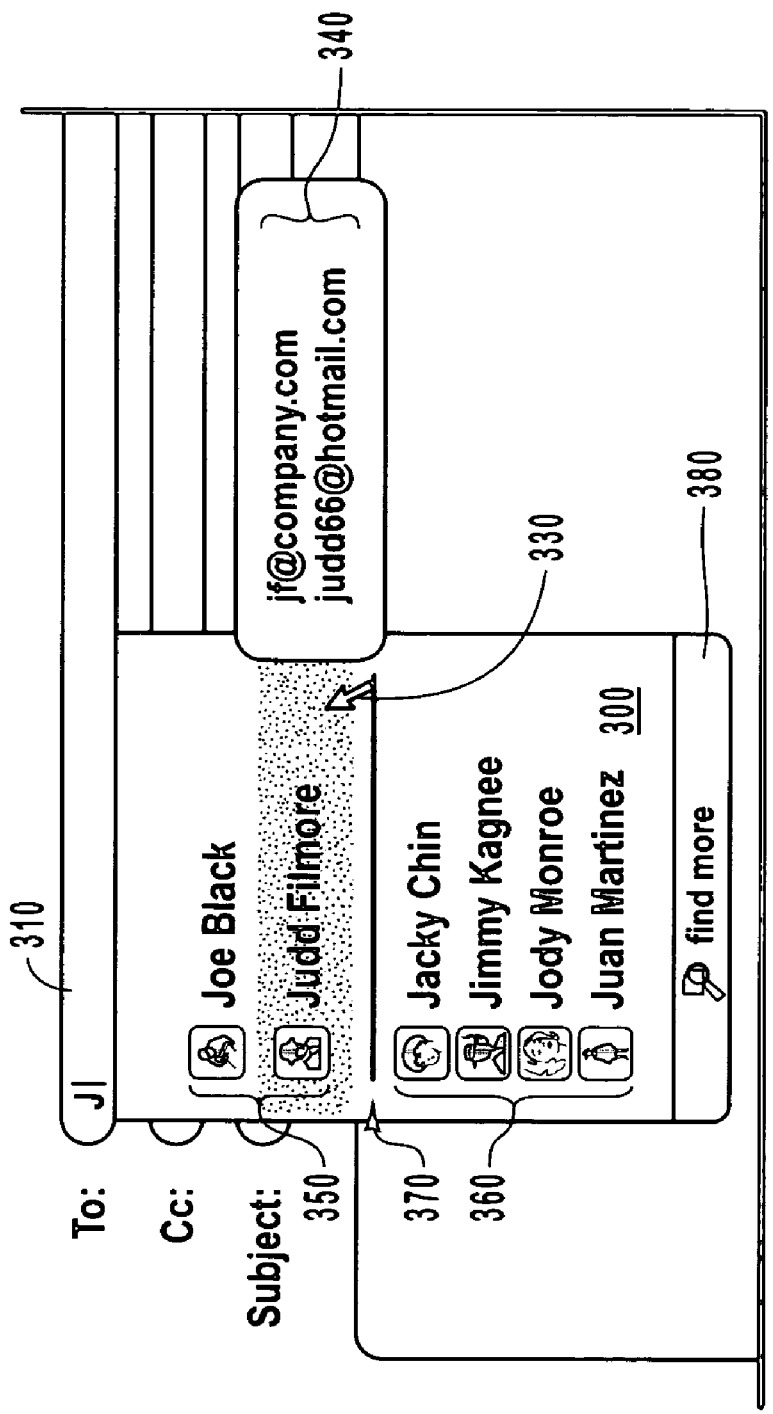
FIG. 3 illustrates one embodiment of a contact text box that contains a list of contact matches corresponding to user input.

FIG. 3 illustrates one embodiment of a contact text box 300, which is being displayed proximate to the "To" type-in line 310 of an email application that is receiving the user input. However, it will be appreciated that the contact text box can be configured to appear in virtually any location with respect to an application interface.

The contact text box 300 is displayed, in the present embodiment, in response to the application receiving user input and upon the application issuing a call to the contact text box 300 to resolve said user input.

Upon receiving the call from the application, the contact text box uses one or more resolvers to query one or more contact information directories for contacts or contact information matching the user input. Any contacts or contact information that are determined to match the user input are considered herein to be a "match." It will be appreciated that any algorithm and set of criteria can be used to determine whether a match exists.

Before, during or after the matches are identified, the resolvers compare the user input against usage patterns that are associated with the contact information. In one embodiment, the comparison of the user input to the usage patterns is performed only after the matches are identified, and only to the matches, thereby conserving the resources that would otherwise be required to compare the user input to usage patterns of contacts that will not be displayed.

In other embodiments, comparison of the user input to the usage patterns is performed irrespective of the identified matches, thereby independently identifying possible additional contacts that can be displayed by the contact text box for the user to consider. This embodiment can be useful, for example, when the usage pattern being considered includes references to associated or related contacts. For example, if the user input ultimately matches a contact by the name of "Judd", as shown in FIG. 3, and Judd is almost always emailed in concert with a related contact named "Mike", it can be useful, in some instances, to display Mike's contact information along with Judd's.

The embodiment of FIG. 3 illustrates one technique for displaying matching contacts (act 240). As shown, six contacts are displayed, each having been identified as matching the user input entered into the application type-in line 310. Each of the contacts can be associated with a property or piece of contact information that is needed by the application to perform a certain function. For example, in the present embodiment, each of the displayed contacts is associated with an email address that will be provided to the application if the corresponding contact is selected.

In some circumstances, a contact can also be associated with multiple values for the same property. For example, a single contact can have different email addresses, including a work email address, a school email address, a personal email address, and so forth. In such circumstances, with no loss of generality, said contact can be displayed multiple times, once for each property value. Additionally, or alternatively, the contact can also be highlighted or displayed in another distinct manner that indicates to the user that multiple values of the required property are present. The user can then view the multiple values by selecting the contact or by moving focus to the contact.

FIG. 3 illustrates such an embodiment in which a contact identified as "Judd Filmore" 330, is associated with multiple properties or pieces of contact information that can be used by the hosting application. In particular, Judd Filmore is associated with two email addresses 340 that can be provided to the email application hosting the contact text box 300.

In this embodiment, as well as others, a user can click a mouse prompt over the contact 330 or otherwise select or direct focus to the contact 330 to view the various values associated with the contact and to select the desired contact information to be supplied to the application. It will be appreciated that when multiple values are associated with a single contact, the corresponding list of values associated with the contact can be arranged in any desired order, including, but not limited to an order based on a likelihood of selection as generally described above with reference to organizing the list of displayed contacts.

FIG. 3 also reflects how the contact text box 300 can segment the search results or matches into visually distinct groupings. For example, in the present embodiment, two visually distinct groupings 350 and 360 are provided. Although they are shown as being separated by a line 370, any method for separating the groupings can be utilized. Other means for separating groupings of matching contacts include, but are not limited to, color schemes (coloring contact bars differently, or providing different color backgrounds), shading, font schemes, borders, physical space, icons and other markers.

When one of the listed contacts is selected, such as with the click of a mouse pointer or with other selection input (act 270), the contact information corresponding to the selected contact, which is appropriate for the particular application, is inserted into the type-in line. What is considered "appropriate contact information" is generally application specific and corresponds to information that is required to perform a desired function with the application. For example, the appropriate contact information for an email application may include the email address of a contact that is necessary for sending an email message. The appropriate contact information may also be specified according to other criteria, such as by the directory from which the contact information is obtained, and so forth.

According to one embodiment, the applications specify what contact information is required by the applications. For example, if an application requires an email address then the application will specify to the contact text box that the appropriate contact information comprises email addresses so that they can be obtained and displayed by the user interface accordingly. It will be appreciated, however, that the user interface can also be configured with security mechanisms to prevent the application from obtaining contact information that is not required by the application.

When the appropriate contact information is provided to the application in response to a user selection of the corresponding contact, it can be said that the user input has been resolved (act 250). Resolving the user input (act 250), however, can also occur before a user selects a contact from the list provided by the contact text box 300. For example, if only a single unambiguous match exists for the user input, that input can automatically be resolved, thereby providing the correspondingly appropriate contact information to the application, and without first receiving an explicit user selection of a contact from the contact text box list.

Once the user input has been resolved (act 250) the resolved user input is replaced in the contact text box and/or application input field with a user interface object corresponding to the resolved user input, which may or may not comprise a selected contact, as described above.

Figure 4:
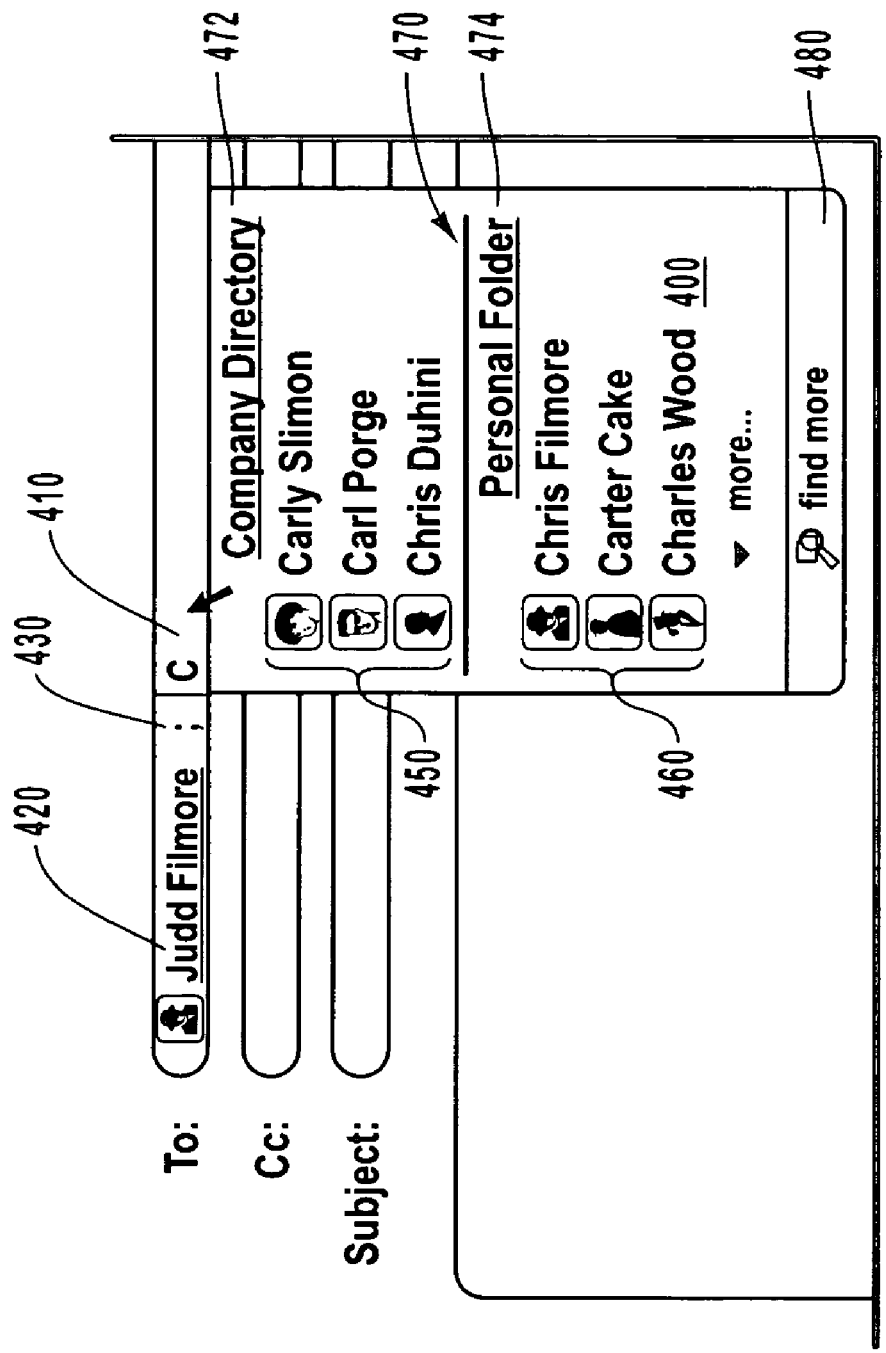
FIG. 4 illustrates another embodiment of a contact text box.

FIG. 4 illustrates an embodiment that sequentially follows the embodiment described above in reference to FIG. 3. As shown, a UI object 420 corresponding to Judd Filmore has replaced the resolved the user input received in FIG. 3. In one embodiment, the UI object 420 comprises a single unalterable object, once the corresponding text has been resolved, which cannot be edited. For example, if a user were to try and backspace over the last letter "e" of the illustrated UI object 420, this action would not only delete the last letter, but the entire object 420 inasmuch as the UI object 420 comprises a single integrated and unalterable object.

As mentioned above, user input can be resolved by selecting a contact from the contact text box, such as by selecting Judd Filmore 330 from contact text box 300. Alternatively, the user input can be resolved in response to receiving additional user input (act 270) that narrows the available matching options down to only a single possible contact. For example, with reference to FIG. 3, if additional user input comprising the text "udd" was received after the user input comprising the letter "j", the combined text "Judd" might only match a single possible contact, in which case the combined text can result in the automatic resolution that Judd should be selected and that the correspondingly appropriate contact information should be provided to the a hosting application. Although this result may be desired, there may also be situations in which this result is not desired. For example, the user might be attempting to write to a new Judd that is not identified by any of the queried contact information directories. In this case, it would be undesirable to automatically resolve the text "Judd."

Accordingly, in one alternative embodiment, the textual input provided to the application is only resolved automatically, without the explicit selection of a contact, when it is determined that a delimiting character has been received. Some examples characters that can sometimes be used as delimiting characters include the colon, semi-colon, coma, period, tab, hyphen, dash, asterisk, pound sign, exclamation, closed parenthetical, and other symbols that can be distinguished from non-limiting characters. This list of delimiting characters, however, is merely illustrative and should not be construed as limiting the scope of the invention. In fact, essentially any character can be construed as a limiting or delimiting, as predefined by the settings applied to the contact text box.

FIG. 4 illustrates how a new contact text box 400 can be generated to resolve new user input 410 that is received upon resolving previously received user input. For example, when the user input received in FIG. 3 was resolved, it caused the correspondingly appropriate contact information to be passed to the host application, as well as the generation of the UI object 420, which replaced the user input. Thereafter, or during the resolution process, a de-limiting semi-colon (430) was added by either the application, the contact text box or the user. As shown in FIG. 4, new user input was then entered, comprising the letter "C." This new input resulted in a new contact text box 400 being generated to perform the method recited above, to resolve the user input and identify any matching contacts from which a selection can be made.

The new user input received in FIG. 4 has resulted in the generation of new contact matches which are categorized into to groupings 450 and 460. Unlike FIG. 3, however, the groupings 450 and 460 in FIG. 4 include titles 472 and 474 that correspond to the directories from which the contacts were selected, to more clearly distinguish the two groups in addition to the separation provided by line 470. It will be appreciated, however, that the titles do not necessarily need to be linked to the databases that are searched. In other embodiments, for example, the titles can be linked to the description of the criteria used to search the databases (e.g., most recently used, last received mail from, etc.), or any other criteria.

Although the previous examples have been provided with respect to email functionality, it will be appreciated that the scope of the invention extends to other embodiments in which the contact information is utilized by other application to enable different functionality. For example, other applications may utilize the contact information to initiate a telephony session, initiate a telephone call, initiate a network connection, initiate a gaming session, access a website, perform a financial transaction, send material goods via postal mail, and so forth.

Attention will now be directed to an embodiment for creating and applying a contact text box using C#. The following segment of C# code can be used as the building block for creating a contact text box:

```
class MyEmailClientWindow: Window
{
    // Create canvas inside window where Contact Text Box will be displayed
    Canvas canvas = new Canvas( );
    // Make sure canvas covers entire window contents
    Canvas.Width = canvas.Height = new Length(100f,
    UnitType.Percent);
    // Attach canvas to window
    this.Content = canvas;
    // Create Contact Text Box control of desired dimensions
    ContactTextBox contactTextBox = new ContactTextBox( );
    contactTextBox.Width = new Length(500); // sets width to 500 pixels
    contactTextBox.Height = new Length(60); // sets height to 60 pixels
    // Position Contact Text Box inside canvas
    Canvas.SetLeft(contactTextBox, new Length(50)); // sets left edge position
```

-continued

```
        Canvas.SetTop(contactTextBox, new Length(50)); // sets top edge
position
        // Select property type Contact Text Box will return
        contactTextBox.PropertyType= ContactPropertyType.EmailAddress;
        // Attach Contact Text Box to canvas so it gets displayed
        canvas.Children.Add(contactTextBox);
}
```

After the user has entered contact information in the Contact Text Box, the following code skeleton can be used to retrieve the desired properties (e.g., email addresses) for all the contacts that were successfully resolved:

```
    // Walk the resolved items collection
    foreach(ResolvedItem item in contactTextBox.ResolvedItems)
    {
        // Display each resolved text
        Console.WriteLine(item.ResolvedText);
    }
```

In some cases, text strings are not resolved automatically in response to receiving additional user input. In such cases, the following line of code can be used to force resolution of the user input.

```
    // Force contact resolution and present GUI if not successful
    contactTextBox.Resolve( );
```

If resolution of the user input is not possible, the user can also be notified to resolve that text manually by selecting other contacts. If a desired contact is not listed by the contact text box, the user can select a "find more" button on the contact text box, such as buttons 380 and 480, which can search for matches using fuzzy matching or a looser set of constraints. The find more button can also launch a contact interface that provides a more comprehensive list of available contacts, such as the interface described in more detail in the aforementioned U.S. patent application Ser. No. 10/324,746, entitled CONTACT PICKER, or an interface, such as that described in U.S. patent application Ser. No. 10/324,250, entitled CONTACT USER INTERFACE, which was filed on the same day and which is incorporated herein by reference.

From the perspective of an application programming interface developed for obtaining contact information according to the invention, a function call or request is generated for a contact text box or interface by an application in response to a user input received by the application. The API then utilizes appropriate computer-executable instructions, such as the code shown above, to generate the contact text box. During the generation of the contact text box, appropriate contact information directories or repositories are queried by the contact text box resolvers to identify a list of contacts that match the user input and that are likely to be selected by the user, along with their corresponding contact information based on usage pattern data compared against the user input.

The identified contacts are then displayed with or without the contact information which will be utilized by the application. Upon receiving a user selection of a displayed contact, the contact text box API then passes the correspondingly appropriate contact information on to the application. The correspondingly appropriate contact information is the contact information that will be used by the application to perform a desired function (e.g., initiate a call, send an email, etc), as specified by the application.

In embodiments where the contact information is not displayed with the contact, the selection of a contact prompts the API to identify and display the contact information related to the selected contact. Thereafter, contact information that is selected by the user is passed on to the application.

It will be appreciated, however, that the foregoing examples of the API and code corresponding to the contact picker dialog are merely illustrative and should not, therefore be construed as limiting the scope of the invention. To the contrary, various different types of code can be implemented by programming interfaces to enable the methods of the invention, for obtaining, displaying and providing desired contact is information.

Furthermore, although many of the examples provided herein are directed to email interface applications, the invention also extends to other applications, including, but not limited to telephony and telephone applications, network gaming applications, financial applications, time management applications, information kiosk applications, internet applications, word processing applications, facsimile and telecopy applications, design applications, image and photo applications, and so forth. Furthermore, even though many of the embodiments shown and described above illustrate interfaces displaying only a limited number of contacts and contact information, it will be appreciated that the interfaces may be modified to display any desired number of contacts and any variety of corresponding contact information.

It will also be appreciated that although many of the embodiments described above relate to providing a listing of contacts by name, the list of contacts may also include rich contact objects (e.g., images) that can be used to ascertain information about the listed contacts. By way of example, and not limitation, each listed contact may be displayed with a corresponding rich tile image that displays certain attributes and that links to other information.

In summary, the present invention provides methods, systems, and computer program products including user interfaces or dialogs, for obtaining and displaying contact information. The interfaces of the invention can be used in various applications to search for and display contact information from a variety of contact information directories. Although many examples are provided with respect to providing contact information when focus input is directed at a type-in line that the scope of the invention extends to embodiments in which focus input is directed to other input objects, such as fields, cells, images, and so forth.

Operating Environment

Figure 5:
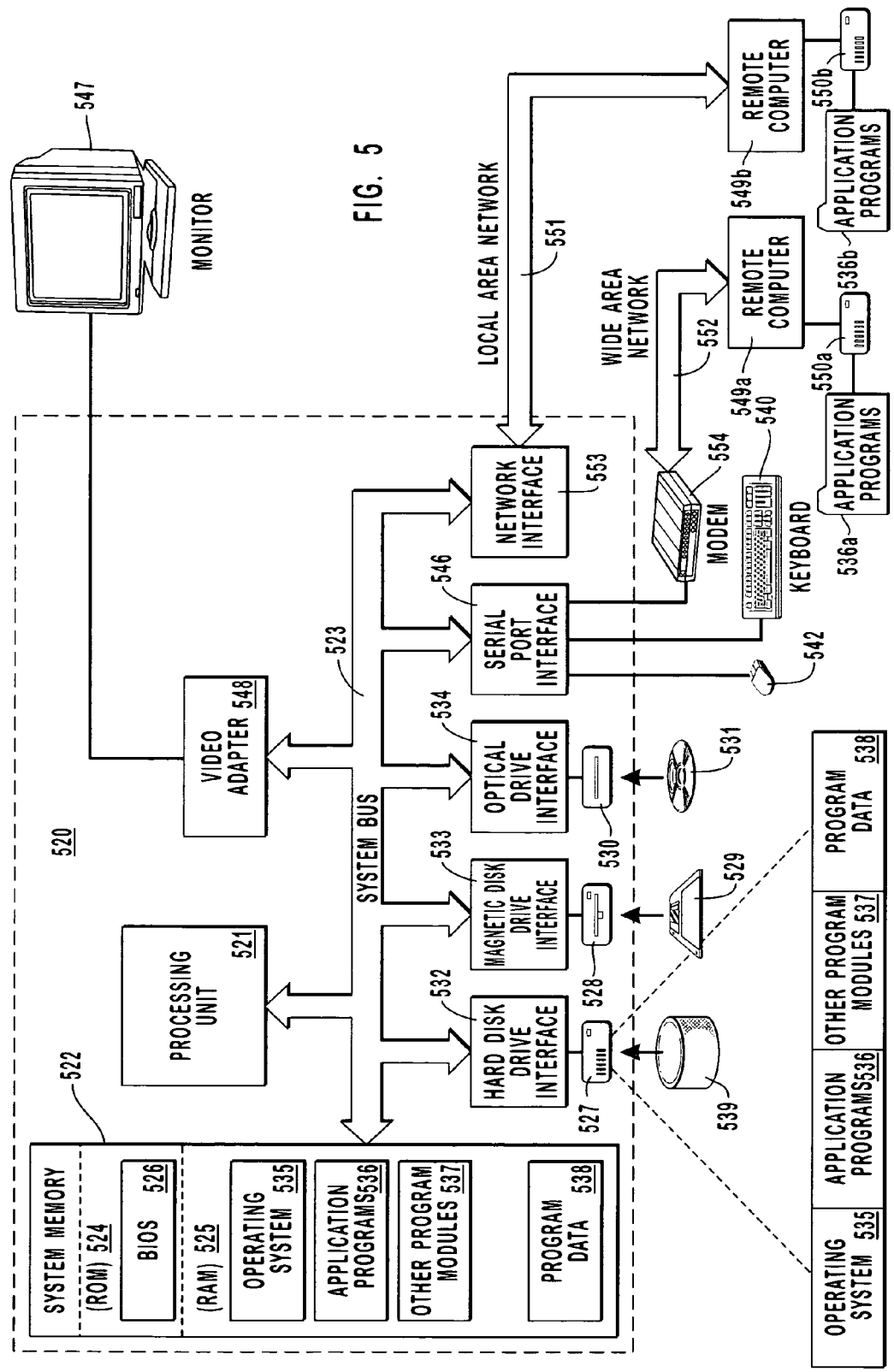
FIG. 5 illustrates one embodiment of an operating system that provides a suitable operating environment for practicing the present invention.

FIG. 5 is illustrated and will now be described to provide a brief, general description of a suitable computing environment in which the invention may be implemented. However, it should be emphasized that the present invention is not necessarily limited to any particular computerized system and may be practiced in a wide range of computerized systems including, but not limited to, telephone and other communication devices, PDAs, information kiosks, and so forth.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an exemplary system for implementing the invention includes a computing system in the form of a conventional computer 520, including a processing unit 521, a system memory 522 comprising computer readable media, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disk drive 530 for reading from or writing to removable optical disk 531 such as a CD-ROM or other optical media. The magnetic hard disk drive 527, magnetic disk drive 528, and optical disk drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disk 531, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 539, magnetic disk 529, optical disk 531, ROM 524 or RAM 525, including an operating system 535, one or more application programs 536, other program modules 537, and program data 538. A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 20 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used. Variations of the above described computing system can also be used to perform the methods of the invention.

Accordingly, the described embodiments are to be considered in all respects only as illustrative and not restrictive. In particular, the present invention may be embodied in other specific forms without departing from its spirit or essential characteristics. Therefore, the scope of the invention is indicated by the appended claims rather than by the foregoing description. All changes which come within the meaning and range of equivalency of the claims are to be embraced within their scope.

What is claimed is:

1. In a computing system that is connected with a display device and that includes a user interface that is configured to display contact information at the display device, a method for resolving user input received at an application and corresponding to contact information that can be utilized by the application to perform a function, the method comprising:

identifying user input that needs to be resolved;

opening a contact text box interface configured to display a list of contacts having contact information matching the user input;

using at least one resolver from the contact text box to query at least one contact information directory for contacts having contact information matching the user input;

applying the user input against at least one usage pattern in the at least one contact information directory;

identifying any contacts satisfying the query and having an appropriate usage pattern; and displaying said any contacts within at least two graphically distinguished and separate groupings, and such that contacts having a higher likelihood of selection are displayed in a first grouping that is positioned above contacts in a second grouping having a lower likelihood of selection.

2. A method as recited in claim 1, further comprising: resolving the user input.

3. A method as recited in claim 2, wherein resolving the user input includes:
receiving additional user input which indicates that one of the displayed contacts should be selected; and
replacing the user input with a corresponding UI object.

4. A method as recited in claim 3, wherein the additional user input includes a selection of the one of the displayed contacts.

5. A method as recited in claim 3, wherein the additional user input includes a textual character that limits said any available contacts to a single contact comprising the one of the displayed contacts.

6. A method as recited in claim 5, wherein the additional user input comprises a delimiting character.

7. A method as recited in claim 2, wherein resolving the user input includes providing contact information corresponding to the one of the displayed contacts to an application.

8. A method as recited in claim 7, wherein the method further includes receiving a request to resolve user input from the application prior to opening the contact text box.

9. A method as recited in claim 8, wherein the application uses the contact information to perform a function.

10. A method as recited in claim 1, further including:
sending a request to update the usage pattern data corresponding to the one of the displayed contacts at a contact information directory from which the one of the displayed contacts was identified.

11. A method as recited in claim 1, wherein the contacts are displayed in an order controlled at least in part by the usage pattern data and wherein the usage pattern includes at least one of a frequency of use, a network proximity, a geographic proximity, a system compatibility, a last selection.

12. A method as recited in claim 1, wherein the displayed contacts includes at least two contacts and the at least two contacts are displayed in said at least two visually distinguished groupings.

13. A method as recited in claim 12, wherein the groupings have titles to indicate a significance corresponding to a distinction between the groupings.

14. A method as recited in claim 12, wherein each of the groupings corresponds to a different database.

15. A method as recited in claim 12, wherein each of the groupings corresponds to a different contact information directory.

16. A method as recited in claim 12, wherein each of the groupings corresponds to a different search criteria used to identify the displayed contacts.

17. A method as recited in claim 1, further including:
receiving additional user input;
using at least one resolver from the contact text box to query at least one contact information directory for contacts having contact information matching a combination of the user input and the additional user input;
applying the combined user input against at least one usage pattern in the contact information directory;
identifying any contacts satisfying the query and having an appropriate usage pattern; and
displaying said any contacts.

18. One or more computer-readable storage media having stored computer-executable instructions for implementing a method in a computing system that is connected with a display device and that includes a user interface that is configured to display contact information at the display device, wherein the method is for resolving user input received at an application and corresponding to contact information that can be utilized by the application to perform a function, the method comprising:
identifying user input that needs to be resolved;
opening a contact text box interface configured to display a list of contacts having contact information matching the user input;
using at least one resolver from the contact text box to query at least one contact information directory for contacts having contact information matching the user input;
applying the user input against at least one usage pattern in the contact information directory;
identifying any contacts satisfying the query and having an appropriate usage pattern; and
displaying said any contacts within at least two graphically distinguished and separate groupings, and such that contacts having a higher likelihood of selection are displayed in a first grouping that is positioned above contacts in a second grouping having a lower likelihood of selection.

19. One or more computer-readable storage media as recited in claim 18, further comprising:
resolving the user input.

20. One or more computer-readable storage media as recited in claim 19, wherein resolving the user input includes:
receiving additional user input which indicates that one of the displayed contacts should be selected; and
replacing the user input with a corresponding UI object.

21. One or more computer-readable storage media as recited in claim 20, wherein the additional user input includes a selection of the one of the displayed contacts.

22. One or more computer-readable storage media as recited in claim 20, wherein the additional user input includes a textual character that limits said any available contacts to a single contact comprising the one of the displayed contacts.

23. One or more computer-readable storage media as recited in claim 22, wherein the additional user input comprises a delimiting character.

24. One or more computer-readable storage media as recited in claim 19, wherein resolving the user input includes providing contact information corresponding to the one of the displayed contacts to an application.

25. One or more computer-readable storage media as recited in claim 24, wherein the method further includes receiving a request to resolve user input from the application prior to opening the contact text box.

26. One or more computer-readable storage media as recited in claim 25, wherein the application uses the contact information to perform a function.

27. One or more computer-readable storage media as recited in claim 18, further including:
sending a request to update the usage pattern data corresponding to the one of the displayed contacts at a contact information directory from which the one of the displayed contacts was identified.

28. One or more computer-readable storage media as recited in claim 18, wherein the contacts are displayed in an order controlled at least in part by the usage pattern data.

29. One or more computer-readable storage media as recited in claim 18, wherein the displayed contacts includes at least two contacts and the at least two contacts are displayed in said at least two visually distinguished groupings.

30. One or more computer-readable storage media as recited in claim 29, wherein the groupings have titles to indicate a significance corresponding to a distinction between the groupings.

31. One or more computer-readable storage media as recited in claim 29, wherein each of the groupings corresponds to a different database.

32. One or more computer-readable storage media as recited in claim 29, wherein each of the groupings corresponds to a different contact information directory.

33. One or more computer-readable storage media as recited in claim 29, wherein each of the groupings corresponds to a different search criteria used to identify the displayed contacts.

34. One or more computer-readable storage media as recited in claim 18, wherein the method further comprises:

receiving additional user input;

using at least one resolver from the contact text box to query at least one contact information directory for contacts having contact information matching a combination of the user input and the additional user input;

applying the combined user input against at least one usage pattern in the contact information directory;

identifying any contacts satisfying the query and having an appropriate usage pattern; and displaying said any contacts.

35. A method as recited in claim 1, wherein said method further includes displaying, along with said any contacts satisfying the query and having an appropriate usage pattern, at least one additional contact that is determined to have contact information that does not match the user input, but that corresponds to a particular usage pattern data.

36. A method as recited in claim 1, wherein a particular contact is displayed in a visually distinct manner than at least one other contact as an indication that said particular contact is associated with a plurality of email addresses.

37. A method as recited in claim 36, wherein the method further includes displaying the plurality of email addresses associated with the particular contact, simultaneously with the display of the particular contact, and in response to hovering a mouse prompt over the particular contact.

38. A method as recited in claim 1, wherein each of said first and second groupings is alphabetized.

39. A method as recited in claim 11, wherein the usage pattern includes at least a geographic proximity.

40. A method as recited in claim 11, wherein the usage pattern includes at least a system compatibility.

* * * * *